United States Patent Office 2,902,374
Patented Sept. 1, 1959

2,902,374

EGG PRODUCTS

Benjamin R. Harris, Glencoe, Ill.

No Drawing. Application December 6, 1955
Serial No. 551,205

9 Claims. (Cl. 99—210)

This invention relates to new and useful egg products, especially egg white products.

It has heretofore been disclosed (U.S. Patent No. 2,637,654) that the time of beating egg whites to a good foam can be shortened, and the tolerance to overbeating can be increased, by adding to liquid egg whites small proportions of certain specific esters, namely, esters of tartaric, malic, malonic, citric and succinic acids with aliphatic alcohols containing less than 3 carbon atoms. Illustrative of said esters are diethyl tartrate, diethyl malate and triethyl citrate. Esters of the aforesaid acids with aliphatic alcohols containing 3 or more carbon atoms are excluded by the express teachings in the patent, tripropyl citrate, for instance, being ineffective and inoperative to improve the whipping properties of egg whites.

In accordance with the present invention, the surprising and unexpected discovery has been made that, while tripropyl citrate, and higher alcohol citrates, for instance, are inoperative to improve the whipping properties of egg whites and the tolerance to overbeating, the esters of certain polycarboxylic acids with isopropyl alcohol are highly effective for these purposes. Such esters comprise the isopropyl alcohol mono- and poly-esters of any one or more of the following aliphatic polycarboxylic acids: malic, citramalic, itaconic, malonic, dimalonic, methylenedimalonic, tricarballylic, glutaric, adipic, succinic, aconitic and saccharic acids. Typical specific examples are the isopropyl alcohol mono- and di-esters of malic acid, the isopropyl alcohol mono- and di-esters of malonic acid, the isopropyl alcohol mono- and di-esters of succinic acid, the isopropyl alcohol mono-, di- and tri-esters of aconitic acid and tricarballylic acid, and mixtures thereof.

The isopropyl alcohol esters can be prepared in accordance with conventional esterification procedures. The isopropyl alcohol, acid, organic solvent such as benzene, in appropriate proportions with the isopropyl alcohol usually being present in excess over stoichiometric proportions (with or without a catalyst, e.g. sulfuric acid), are subjected to azeotropic distillation until the requisite quantity of water is collected. The reaction vessel is fitted with a packed column capable of separating the desired azeotrope. The amount of isopropyl alcohol in the aqueous layer separated is determined by density measurements. Upon reaching the desired stage of the reaction, the reaction mixture, in those cases where sulfuric acid is utilized, is treated with twice the amount of precipitated calcium carbonate necessary to react with the sulfuric acid used. The benzene and excess isopropyl alcohol are removed by distillation under reduced pressure. The residue is dissolved in an appropriate organic solvent, for instance, ether, and filtered. The isopropyl alcohol ester is recovered from the ether solution by any suitable means, for example, by precipitation through the addition of petroleum ether or other precipitant. The isopropyl alcohol ester is usually obtained in the form of a mixture which may, if desired, be purified.

The aforesaid isopropyl alcohol esters must be used in proportions sufficient to enhance appreciably the whipping properties of the egg whites. In the case of ordinary liquid egg whites or frozen liquid egg whites, the proportions will usually range, for instance, from about 0.01% to about 0.06%, by weight of said liquid egg whites, a particularly desirable range being about 0.02% to 0.04%. In the case of dried egg whites or dried egg albumen, the proportions will usually range from about 0.1% to about 0.5%, by weight of said dried egg whites or albumen, about 0.2% to 0.3% being a good average. The desired optimum proportions, in any given case, can very readily be ascertained by simple test.

The following examples are illustrative of compositions falling within the scope of the invention. All parts listed are by weight.

*Example 1*

| | Parts |
|---|---|
| Fresh liquid egg whites | 100 |
| Isopropyl alcohol di-ester of malic acid | 0.025 |

*Example 2*

| | |
|---|---|
| Fresh liquid egg whites | 100 |
| Isopropyl alcohol mixed esters of succinic acid containing predominantly the di-ester | .025 |

*Example 3*

| | |
|---|---|
| Fresh liquid egg whites (acidified with lactic acid to pH 6.9) | 100 |
| Isopropyl alcohol di-ester of malic acid | .02 |

*Example 4*

| | |
|---|---|
| Fresh liquid egg whites (acidified with lactic acid to pH 5) | 100 |
| Isopropyl alcohol di-ester of malonic acid | .03 |

*Example 5*

| | |
|---|---|
| Dried egg albumen (prepared by treatment with glucose oxidase-catalase enzyme system) | 100 |
| Isopropyl alcohol tri-ester of carballylic acid | 0.325 |

*Example 6*

| | |
|---|---|
| Dried egg albumen (plus citric acid to produce pH 5) | 100 |
| Isopropyl alcohol di-ester of malic acid | 0.225 |

*Example 7*

| | |
|---|---|
| Dried egg albumen | 100 |
| Isopropyl alcohol mono-ester of succinic acid | 0.23 |

*Example 8*

| | |
|---|---|
| Frozen liquid egg whites | 100 |
| Isopropyl alcohol di-ester of succinic acid | 0.025 |

*Example 9*

| | |
|---|---|
| Frozen fermented liquid egg whites | 100 |
| Isopropyl alcohol di-ester of malic acid | 0.03 |

*Example 10*

| | |
|---|---|
| Frozen liquid egg whites | 100 |
| Isopropyl alcohol mixed di- and tri-esters of tricarballylic acid | 0.025 |

*Example 11*

| | |
|---|---|
| Liquid whole eggs | 100 |
| Isopropyl alcohol di-ester of malic acid | 0.03 |

As indicative of the effect of the addition of the aforesaid isopropyl alcohol esters to egg whites, the following examples may be noted.

A. To 300 ml. freshly broken liquid egg whites 150 ml. of water are added. Foam heights are measured in the following manner. The mixture of egg whites and water is mixed (in a Hobart mixer No. C10, in a 10 quart bowl and using a standard wire loop whip) at medium speed for 1½ minutes and then for an additional 1½ minutes at high speed. The mixing bowl is removed from the machine and the foam knocked off the wire whip into the mixing bowl. The foam is then leveled by hand to form a continuous smooth surface. The height of the foam is then measured with a ruler. In the case of the control (containing only the liquid egg whites and the water), the foam height is 5¼ inches. With the addition of 0.025%, based on the weight of the 300 ml. of said liquid egg whites, of isopropyl alcohol di-ester of malic acid, the foam height is 6 inches and the foam has a very desirable firmness. With the addition of the isopropyl alcohol triester of carballylic acid, the foam height is 6¼ inches.

B. In a test similar to the A test, but wherein the pH of the liquid egg whites is initially reduced to 6.9 by the addition of lactic acid, the foam height of the control is 5 inches; and, with the addition of 0.025% isopropyl alcohol di-ester of succinic acid, the foam height is 6 inches.

C. In a test similar to the A test, but wherein the pH of the liquid egg whites is initially reduced to 5 by the addition of lactic acid, the foam height of the control is 3 inches; and, with the addition of the isopropyl alcohol diester of succinic acid, the foam height is 5¾ inches, the foam having desirable dryness and stiffness. With mixed isopropyl alcohol mono- and di-esters of succinic acid containing predominantly the di-ester of succinic acid, the foam height is 5¾ inches.

D. To 41 grams dried egg albumen (prepared in accordance with a known process involving treating the liquid egg whites with a glucose oxidase-catalase enzyme system in the presence of added hydrogen peroxide appreciably to reduce the glucose content thereof, following by drying said treated liquid egg whites) 430 ml. water are added. The procedure described in A is followed. The foam height of the control is 5¼ inches. With the addition of 0.25%, based on the weight of the dried albumen, of the isopropyl alcohol di-ester of aconitic acid, the foam height is 6¼ inches and the foam is distinctly firmer than that of the control.

E. In a test similar to D, but wherein 1 gram of citric acid is added to bring the pH to just below 5, the control forms a soupy mixture which could not be considered a foam. With the addition of 0.25% of the isopropyl alcohol di-ester of malonic acid, a foam height of 4½ inches is obtained.

F. 40 grams dry egg albumen (of the type described in D), 80 grams sucrose and 300 cc. water are placed in the bowl of a Hamilton Beach mixer and mixed for 2 minutes at slow speed to effect solution, no foam being generated under these conditions. Then mixing is effected at high speed to a stiff peak foam. The time of mixing at high speed to reach a stiff peak foam is measured by means of a stop watch. The control, which produces a wet relatively unstable peak foam, requires 3½ minutes mixing at high speed. With the addition of 0.2% of the isopropyl alcohol di-ester of malic acid, 3 minutes are required to produce a stiff peak foam which is desirably dry and which has a greater total volume than the control.

G. In a test similar to the F test, but wherein 1 gram citric acid is added to reduce the pH to just below 5, the control requires 8 minutes to reach the peak foam stage. With the addition of 0.2% of the isopropyl alcohol di-ester of malonic acid, the time required to reach the peak foam stage is 5½ minutes, and the foam is of greater volume and drier character than that of the control.

H. In a test similar to the F test, but using 305 ml. of fresh liquid egg whites containing 1 gram of cream of tartar (which brings the pH of the liquid egg whites down to about 7), 80 grams of sugar are added in 20 gram increments every 15 seconds. The control reaches a stiff peak foam in 4 minutes of mixing at high speed. With the addition of 0.025% of a reaction mixture containing approximately equal amounts of the isopropyl alcohol di- and tri-esters of tricarballylic acid, a stiff peak foam is reached after 3 minutes of mixing at high speed, and a greater meringue volume is obtained over that of the control.

The invention is especially applicable to the treatment of liquid egg whites or frozen liquid egg whites, either untreated or modified, in the liquid stage, in various ways as, for instance, by fermentation under natural conditions, by cultures of acid or alcohol forming organisms, by yeast or bacterial treatment, or by glucose oxidase-catalase treatment, all of which procedures serve to effect a reduction in the glucose content of the egg whites. The invention is likewise of utility in egg white products having varying pH values as, for instance, of the order of 9, as in the case of freshly broken eggs, or of lesser values, such as 8, 7 or even as low as about 5, as may result from the use of cream of tartar or acid additions such as of lactic, citric, tartaric or other edible acids or of buffer salts such as monosodium acid phosphate. Although, as indicated above, the invention is especially applicable to the production of liquid egg whites (which may subsequently be frozen) treated or modified or not, to which have been added the aforesaid isopropyl alcohol esters, as previously described said liquid egg whites (or thawed frozen egg whites) may be dried, for instance, by pan drying, spray drying, foam drying or other drying procedures and the resulting dried egg albumen, when reconstituted with water in accordance with conventional practices, exhibits improved whipping properties. The aforesaid isopropyl alcohol esters can also be admixed with previously dried egg whites or albumen, and, in such case, it is desirable to effect a substantially uniform distribution of said esters through the dried egg whites or albumen.

The improved egg white products of the present invention can be used effectively and with marked advantage in the baking of cakes, notably angel food cakes, in angel food prepared cake mixes, in the candy and confectionery field, in meringue powders, in marshmallows, in cream toppings, and, in general, for the uses to which egg whites are commonly put, and where the advantages of improvement in beating or whipping characteristics are a desideratum. In the production of angel food cakes, the egg white products of the present invention tend, in general, to cause a more rapid rise in foam in the mixing bowl in the making of the cake batter and to produce a foam having a lower density, and the resulting baked cakes are characterized by superior volume, texture and appearance.

The term "egg white," as used in the claims, is intended to encompass generically the liquid egg whites, concentrated or diluted liquid egg white, frozen egg whites, and dried egg whites, unless the context expressly indicates otherwise. The term "egg product" is used in a generic sense to include egg white, whole egg and yolk products which can be beaten or whipped to embody and hold air therein. In this latter connection, it may be pointed out that, while the invention has been described mainly in connection with the production of egg whites, where it has its most important and significant advantages, it also is of utility, as indicated, in connection with other egg products which contain substantial proportions of egg yolks as, for instance, whole eggs and egg yolk products which, in use, are beaten or whipped to incorporate air thereinto.

What I claim as new and desire to protect by Letters Patent of the United States is:

1. An improved egg product containing from about 0.1% to about 0.5%, on the dry weight basis, of an isopropyl alcohol ester of at least one aliphatic polycarboxylic acid selected from the group consisting of malic acid, citramalic acid, itaconic acid, malonic acid, dimalonic acid, methylenedimalonic acid, tricarballylic acid, glutaric acid, adipic acid, succinic acid, aconitic acid and saccharic acid.

2. An improved egg white containing from about 0.1% to about 0.5%, on the dry weight basis, of an isopropyl alcohol ester of an aliphatic polycarboxylic acid selected from the group consisting of malic acid, citramalic acid, itaconic acid, malonic acid, dimalonic acid, methylenedimalonic acid, tricarballylic acid, glutaric acid, adipic acid, succinic acid, aconitic acid and saccharic acid.

3. An improved egg white in accordance with claim 2, wherein said ester is an isopropyl alcohol di-ester of malic acid.

4. An improved egg white in accordance with claim 2, wherein said ester is the isopropyl alcohol di-ester of malonic acid.

5. An improved egg white in accordance with claim 2, wherein said ester is the isopropyl alcohol di-ester of succinic acid.

6. An improved egg white in accordance with claim 2, wherein said ester is the isopropyl alcohol di-ester of aconitic acid.

7. An improved egg white in accordance with claim 2, wherein said ester is the isopropyl alcohol di-ester of saccharic acid.

8. An improved egg white in accordance with claim 2, containing an edible acidic material, said egg white having a pH between about 5 and 7.

9. An improved dried egg white containing from about 0.1% to about 0.5%, by weight, of an isopropyl alcohol ester of an aliphatic polycarboxylic acid selected from the group consisting of malic acid, citramalic acid, itaconic acid, malonic acid, dimalonic acid, methylenedimalonic acid, tricarballylic acid, glutaric acid, adipic acid, succinic acid, aconitic acid and saccharic acid.

References Cited in the file of this patent
UNITED STATES PATENTS 2,637,654   Koethe   May 5, 1953
2,667,419   Gooding et al.   Jan. 26, 1954